United States Patent
Vahdat-Pajouh et al.

(10) Patent No.: US 12,154,332 B2
(45) Date of Patent: *Nov. 26, 2024

(54) METHOD AND DEVICE FOR DETERMINING AN ENVIRONMENT MAP BY A SERVER USING MOTION AND ORIENTATION DATA

(71) Applicant: Design Reactor, Inc., Palo Alto, CA (US)

(72) Inventors: Darius Vahdat-Pajouh, Berlin (DE); Michal Bucko, Berlin (DE)

(73) Assignee: Design Reactor, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,158

(22) Filed: Jan. 30, 2023

(65) Prior Publication Data
US 2023/0298344 A1    Sep. 21, 2023

Related U.S. Application Data

(63) Continuation of application No. 17/230,373, filed on Apr. 14, 2021, now Pat. No. 11,568,598, which is a (Continued)

(30) Foreign Application Priority Data
Oct. 15, 2018   (DE) .................... 10 2018 125 397.4

(51) Int. Cl.
*G06V 20/20*    (2022.01)
*G06T 17/05*    (2011.01)
*G06V 10/40*    (2022.01)

(52) U.S. Cl.
CPC .............. *G06V 20/20* (2022.01); *G06T 17/05* (2013.01); *G06V 10/40* (2022.01)

(58) Field of Classification Search
CPC ......... G06V 20/20; G06V 10/40; G06T 17/05
See application file for complete search history.

(56) References Cited

U.S. PATENT DOCUMENTS 10,482,674 B1 *  11/2019  Wu .................. G09B 25/00
11,568,598 B2 *  1/2023  Vahdat-Pajouh ...... G06V 10/40
(Continued)

FOREIGN PATENT DOCUMENTS

WO     2017166089 A1    10/2017

OTHER PUBLICATIONS

Chinese Office Action for related application No. 201980078269.2 issued on Jun. 7, 2024, pp. 1-7.
(Continued)

*Primary Examiner* — Maurice L. McDowell, Jr.
(74) *Attorney, Agent, or Firm* — Pillsbury Winthrop Shaw Pittman, LLP

(57) ABSTRACT

Method for determining an environment map comprising, server-side receiving of motion data of a mobile device, server-side receiving of orientation data of a camera of the mobile device and server-side receiving of the respective image of the camera associated with the received motion data and orientation data, server-side evaluation of the received image together with the motion data and the orientation data for creating a server-side point cloud, the server-side point cloud forming at least in the parts the environment map.

20 Claims, 3 Drawing Sheets

Related U.S. Application Data continuation of application No. PCT/EP2019/073630, filed on Sep. 5, 2019.

(56) References Cited

U.S. PATENT DOCUMENTS

| | | | |
|---|---|---|---|
| 2017/0193700 A1* | 7/2017 | Jung | G06T 17/20 |
| 2018/0096521 A1* | 4/2018 | Baumberg | G06T 7/571 |
| 2019/0026948 A1* | 1/2019 | Kellogg | G06T 19/006 |
| 2020/0090409 A1* | 3/2020 | Fink | G06T 7/579 |
| 2022/0101601 A1* | 3/2022 | Frank | G06T 17/05 |

OTHER PUBLICATIONS

Liu et al., "Robust Keyframe-based Monocular SLAM for Augmented Reality", 2016 IEEE International Symposium on Mixed and Augmented Reality, pp. 1-10, Dec. 15, 2016, (downloaded on Jun. 4, 2024).

Middelberg et al., "Scalable 6-DOF Localization on Mobile Devices", Computer Vision—ECCV 2014, pp. 268-283 (1-16), Sep. 12, 2014.

* cited by examiner

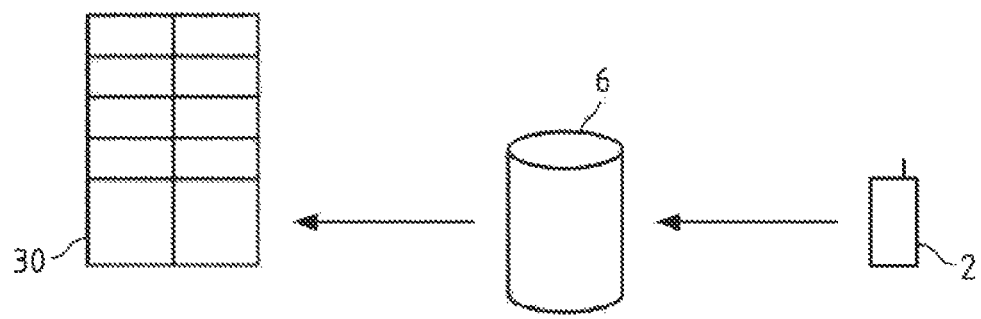
Fig.3
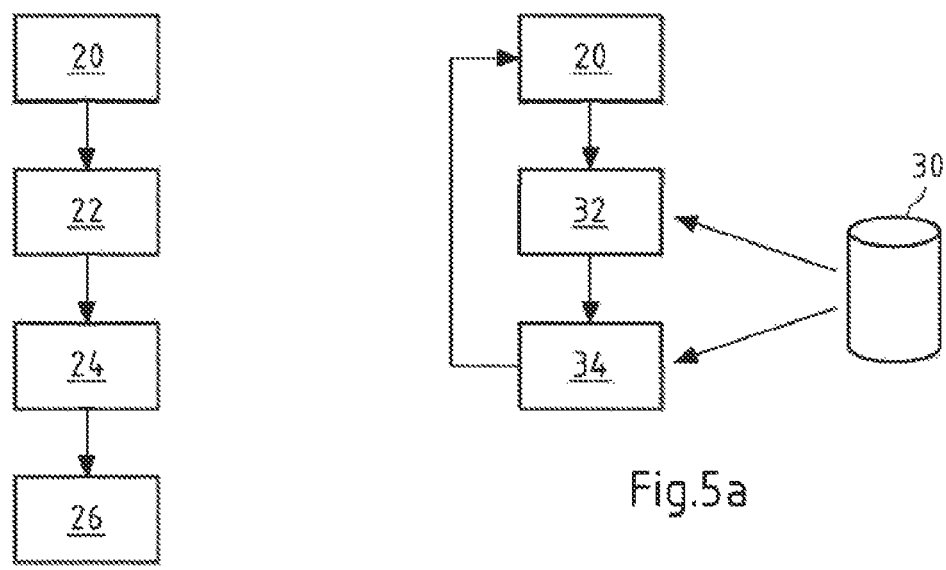
Fig.4
Fig.5a
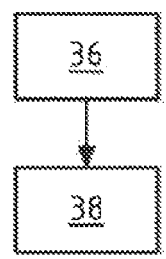
Fig.5b

METHOD AND DEVICE FOR DETERMINING AN ENVIRONMENT MAP BY A SERVER USING MOTION AND ORIENTATION DATA

CROSS-REFERENCE TO RELATED PATENT APPLICATIONS

This patent application is a continuation of U.S. application Ser. No. 17/230,373 filed on 14 Apr. 2021, titled, "METHOD AND DEVICE FOR DETERMINING AN ENVIRONMENT MAP BY A SERVER USING MOTION AND ORIENTATION DATA." U.S. application Ser. No. 17/230,373 is a continuation of International Application No. PCT/EP2019/073630, filed on Sep. 5, 2019, which claims the benefit of priority to German Patent Application No. 10 2018 125 397.4, filed Oct. 15, 2018. The entire content of each afore-mentioned patent filing is hereby incorporated by reference.

FIELD OF INVENTION

The subject matter relates to a method and a server for determining an environment map.

BACKGROUND

The measurement and evaluation of an environment of a mobile device is possible due to the good quality of camera images of mobile devices as well as good sensor values. It is possible to detect features in the image based on orientation data (pose) of a camera of a mobile device as well as a respective image (frame) of a camera of the mobile device and to assign points of a point cloud to these features.

Features in an image have a relative position in the image and, depending on a position and an orientation of a camera (pose transform), a position of the feature in a global coordinate system can be determined from this. In particular, it is possible to determine a coordinate system for respective fixed reference points, in which the point coordinates of the points of the point cloud are determined.

The determination of characteristic features and the calculation of point clouds therefrom is sufficiently known and is used, for example, in so-called augmented reality (AR) applications. Well-known examples of such augmented reality applications are ARKit from Apple® and ARCore from Google®. Both are application-specific programming interfaces that make it possible to create and use point clouds for augmented reality applications through the mobile device.

A disadvantage of determining the point cloud in the mobile device is that, on the one hand, the computing power is limited and, on the other hand, a drift in the point coordinates in the global coordinate system can occur due to erroneous sensor data. Thus, it is known that the drift is 1% to 10%, which may be due in particular to insufficient evaluation of the available sensor data.

BRIEF SUMMARY OF THE INVENTION

The subject matter is therefore based on the object of optimizing an environment map based on points and point coordinates.

This object is solved by a method according to claim 1 and a server according to claim 20.

According to the subject matter, it is proposed that motion data of a mobile device are received on the server side. A mobile device can be in particular a cell phone, a tablet computer, smart glasses, wearables or the like. Motion data can in particular be tilt and acceleration information, which can be detected in the mobile device by means of suitable sensors, for example tilt sensors and/or acceleration sensors. With the aid of the motion data, a movement of the mobile device in space can be detected. In particular, the motion data can be used to determine the position of the mobile device relative to a reference point. In particular, motion data is evaluated between two images to determine the change in position of the device relative to the real object captured in the image.

Furthermore, it is proposed that orientation data of a camera of the mobile device are received on the server side. Orientation data (pose) of a camera can be expressed by a direction of a vector in a coordinate system, the vector being in particular in the optical axis of the camera. In particular, the coordinate system is a global coordinate system in which a first axis is parallel to gravity, a second axis is parallel to the horizontal, and a third axis is perpendicular to the plane spanned by the first two axes. This can be used to determine the orientation of the optical axis of the camera in three-dimensional space.

Finally, the camera of the mobile device captures a sequence of images, particularly in a video. When an image of the camera has been captured, together therewith the orientation information in terms of orientation data can be captured in the mobile device and it can be captured what motion information has been captured between one of the previous images and the current image based on the motion data. This information, i.e., the motion data and orientation data, together with the associated image of the camera, can be received on the server side.

An image of the camera can be a so-called "frame" of a moving image. According to the subject matter, it is possible that on the server side each individual image or only images of the camera that are not immediately neighboring in time are received. For example, it is possible that only every 5th, every 10th, every nth (n>10) image of the camera is received on the server side.

To create the environment map, it is now proposed that on the server side, the received image is analyzed together with the motion data and the orientation data to create a server side point cloud. In particular, the server-side point cloud is created using a simultaneous localization and mapping (SLAM) algorithm in the server. The creation of a point cloud based on images is known per se, but it is not known that the motion data and the orientation data of the mobile device are used for this purpose. Due to the fact that, on the one hand, greater computing power is available on the server side and, on the other hand, latency is allowed for creating the point cloud, the point cloud created on the server side will generally represent the environment better than a point cloud created on the mobile station side. Using the server-side point cloud, an environment map is created at least in part.

In the server-side analyzation of the received image, both the motion data and the orientation data are used, and in particular a transformation of the acquired points in the image into point coordinates in a global coordinate system can be calculated therewith.

The motion data can also be understood as IMU data (inertial measurement data). The orientation data can also be understood as pose-transform data.

The server-side generated point cloud has a higher resolution and a higher accuracy than a mobile station-side generated point cloud. The higher resolution is justified in particular by more computing power and higher computational accuracy, as well as the fact that server-side data from a large number of images from completely different points in time, even hours, days or weeks apart, can be used to continuously supplement and/or adjust the point cloud. The greater accuracy is justified by the fact that features in images can be detected with a wide variety of algorithms on the server side in order to be able to describe a three-dimensional structure within the space on the basis of a sequence of images using point coordinates.

According to one embodiment, it is proposed that additionally a mobile station side point cloud created by the mobile device is received on the server side and this mobile station side point cloud is combined with the server side point cloud to determine a new server side point cloud. Since a point cloud has already been created in the mobile device using appropriate computational techniques, this can be used to enrich the server-side computed point cloud. By unifying the mobile-station-side computed point cloud with the server-side point cloud, the new server-side point cloud becomes more robust and accurate.

According to one embodiment, it is proposed that point coordinates represent a point cloud, where points of the point cloud correspond to respective one of the point coordinates. With the help of the points or the point coordinates, objects, respectively particular features of objects, can be described with respect to their position in space.

It is proposed that point coordinates are represented by vectors. On the one hand, the origin of the vector can be a globally valid origin and, on the other hand, it is possible that vectors to point coordinates are determined depending on recognized points or defined anchors. Here it is possible that, for example, GPS coordinates are used to represent the origin of a vector. The point coordinates represent points in a globally valid space that represent real objects.

A surface of a real object can be described with a plurality of points in three-dimensional space. Depending on the evaluation algorithm, the positioning of the points is more or less accurate. By a server-side evaluation of the orientation data as well as the motion data together with the images of the camera, the points can be determined with a higher accuracy and a greater density than is possible on the mobile station side, thus making the server-side point cloud for determining the environment map more robust and accurate.

According to one embodiment, it is proposed that when unifying the mobile station-side point cloud with the server-side point cloud, the points of the server-side point cloud are at least partially supplemented by the points of the mobile station-side points. Here, it is possible to weight the points of the mobile station side point cloud on the server side and to add only points with a weighting above a threshold value of the server side points. In this case, a density of points in an area can be relevant for the weighting of the individual points in this area.

It is also possible that the point coordinates of the points of the server-side point cloud are at least partially converted using the point coordinates of the points of the mobile station-side point cloud and/or vice versa. For example, it is possible that a feature in an image is represented on the server side by a point with point coordinates that was referenced on the mobile station side by a point with point coordinates that differ only marginally from the point coordinates of the server side point. In such a case, for example, a new point can be calculated from two points by interpolation, averaging, or other computational methods, and its point coordinates can be used for the new server-side point cloud.

According to an embodiment, it is proposed that the point coordinates of the points of the mobile station side point cloud are corrected using the motion data evaluated on the server side. The motion data can be evaluated on the server side with greater accuracy than is possible on the mobile station side. In particular, the motion data can be corrected on the server side by comparing the data from the motion sensors with image data. The motion data optimized in this way can be used to correct the point coordinates of the points of the point cloud on the mobile station side. The point coordinates of the points of the point cloud on the mobile station side were calculated on the mobile station side using the motion data acquired and selected on the mobile station side as well as the orientation data acquired and selected on the mobile station side. Due to calculation errors, a drift can occur here, due to which the point coordinates become less accurate with increasing duration of the acquisition of the points relative to each other and/or to a common origin. That means that in a global coordinate system the point coordinates are less exact with increasing duration of the acquisition of the points. This drift can be counteracted by adjusting based on the motion data evaluated on the server side.

The same applies to orientation data, which is received on the server side and evaluated on the server side. Using this orientation data evaluated on the server side, the point coordinates obtained on the mobile station side can also be corrected.

According to an embodiment, it is proposed that the orientation data received on the server side is corrected on the server side using the received motion data. By using the motion data, it is possible to compensate for errors in the orientation data and vice versa.

According to an embodiment, it is proposed that feature detection and/or feature description is performed in the received image. So-called "feature detection" and "feature description" is known per se. In particular, MOPS or SIFT methods are used for this purpose. By server-side evaluation of the image it is possible to optimize feature descriptions. So-called descriptors "descriptors" (feature descriptions) can be optimized by learning algorithms. For feature description, it is possible to evaluate the point coordinates on the server side and to find optimal descriptors based on the evaluation, in particular by means of deep learning algorithms. Feature descriptors are in particular those features that are invariant, in particular to rotation, translation, panning, zooming, light change and/or the like.

According to one embodiment, it is proposed that a bundle adjustment is performed on the server side in the received image.

Because the point cloud is stored on the server side and is in particular persistent, it can be compared with point clouds of further mobile devices.

It is also possible to perform extensive analyses of the point cloud in order to perform an outlier removal in the received mobile station-side point cloud, if necessary. Here it is possible to identify such points that have been detected incorrectly with a high probability. In particular, a statistical evaluation can be performed so that outliers are detected which have arisen due to faulty image evaluation and are not caused by objects in space.

The point cloud on the mobile station side is created using visual-inertia odometry.

Problematic with purely mobile-station bound point clouds is the so-called "loop closure", i.e., the recognition of previously detected points and previously visited locations within an AR session. Loop closure can be determined through a server-side point cloud. In particular, it is possible to recognize previously detected images and/or points and conclude from this that a so-called "loop closure" has occurred.

If a loop closure has been calculated on the server side, a drift at point coordinates and points of the point cloud determined on the mobile station side can be corrected. It is possible to determine the total drift of a closed ring (loop closure) and to shift individual point coordinates of the points of the point cloud retroactively by the drift or a fraction of the drift. The displacement can be dependent on a displacement vector, which is determined by the drift. The magnitude of the shift vector may decrease with increasing temporal distance from the image in which the loop closure was detected.

It is also possible that the image is evaluated on the server side. In particular, contrast, brightness, sharpness, depth of field and the like can be evaluated on the server side and setting data can be determined for the camera on the mobile station side depending on this. Such setting data can then be transmitted to the mobile device in order to set the camera there, so that the image information is optimized for calculating the point cloud.

It is also proposed that the server-side point cloud, in particular the new server-side point cloud, is transmitted to the mobile device. By this it is possible to replace or optimize the point cloud present in the mobile device. It is also possible that such a point cloud is transmitted to devices in which no point cloud can be calculated at all on the mobile station side. Only on the basis of the image information and the motion and orientation data can a mobile device contribute to the determination of point clouds and receive point clouds.

Localization of the mobile device in space can then be accomplished by matching current points in an image with points in the point cloud. If there is a match, the position of the device can be determined from this without the device itself having to acquire position information.

To determine vector origins, it is possible to enrich the server-side point cloud with anchors. Anchors can be set relative to points in the point cloud.

According to one embodiment, it is proposed that the server-side point cloud is received by a mobile device and that an augmented reality application is initialized in the mobile device using the received point cloud. Thus, at the beginning of an AR application, information about the environment is already available in the form of a point cloud.

It is also possible that server-side point clouds are received from a plurality of mobile devices on the mobile station side and that the received mobile station-side point clouds are used to adapt the server-side point cloud. Here, it is exploited that point clouds of a particular environment are determined from a plurality of devices. This multiplicity of point clouds can be integrated into the server-side point cloud to make it more robust and accurate.

It is also possible to detect features depending on a semantic environment of the application. Thus, it is possible to determine at least two instances of the point clouds on the server side and to learn at least one feature in each instance by feature detection and/or feature description. A respective instance including the learned features can be transmitted to a mobile device.

By means of the point cloud determined on the server side, it is possible to determine the position of a mobile device. Here, a point cloud of a mobile device can be compared with the server-side point cloud. In particular, points captured in a current image can be compared to points in the point cloud, and if there is a match, positioning of the mobile device in the virtual environment determined by the point cloud can be performed.

BRIEF DESCRIPTION OF THE FIGURES

In the following, the subject matter is explained in more detail with reference to a drawing showing embodiments. In the drawing show:

FIG. 3 an arrangement for acquiring motion data, orientation data and/or point clouds from a mobile device;

FIG. 4 a sequence for determining a server-side point cloud;

FIG. 5*a* a flow of a loop closure;

FIG. 5*b* an adjustment of mobile station side point coordinates depending on a drift;

DETAILED DESCRIPTION

With the aid of the present method, it is possible to create a central point cloud based on motion data, orientation data and/or point clouds acquired on the mobile device side, in order to thus solve positioning tasks in an optimized manner.

On a mobile device, visual and regress-based odometry can be performed to create a mobile station-side point cloud. This is well known and is supported by programming interfaces such as ARKit from Apple® and ARCore from Google®. The disadvantage of local methods is that although they have a good relative positioning capability, they perform erroneous positioning in large-scale environments and are neither robust nor accurate enough to be fed to industrial applications. Moreover, the mobile station side point clouds are limited, especially due to limited memory as well as limited computational power.

Therefore, the subject matter is based on the idea to process the information collected on the mobile station side on the server side in such a way that an environment map and a positioning therein is possible even in large environments over a large number of mobile devices with a high accuracy and great robustness.

Figure 1:
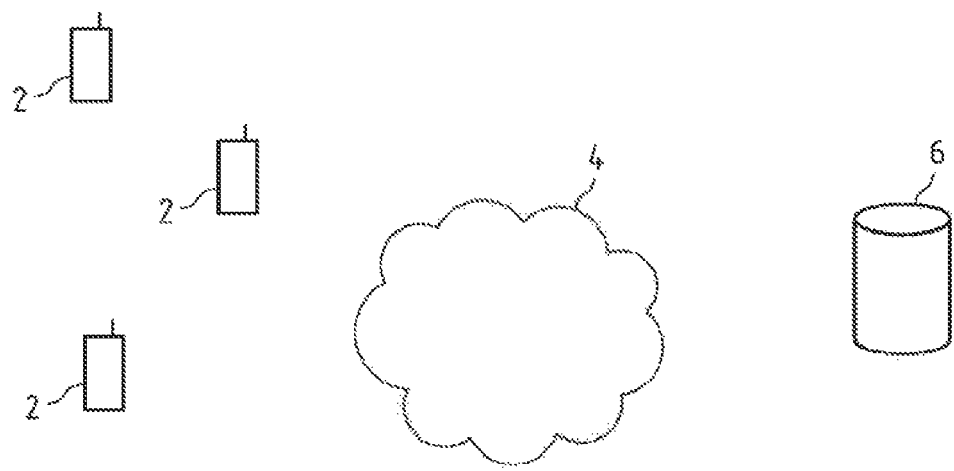
FIG. 1 a system for determining an environment map.

It is proposed that data available from an odometry performed on the mobile station side is used and enriched on the server side. For this purpose, mobile stations 2 are connected to a central server 6 via a wide area network 4, as shown in FIG. 1. Bidirectional communication is possible.

According to the subject matter, at least movement data and orientation data are transmitted from the mobile stations 2 to the server 6 via the wide area network 4. In addition, a transmission of the point cloud, in particular the so-called "raw feature points" can also be transmitted. The motion data is also described as IMU (inertial measurement stater) and the orientation data is also described as pose transform data.

On the server side, a server-side point cloud is calculated with the received data in a SLAM system (Simultaneous Localization and Mapping). To create the point cloud, it is necessary to assign point coordinates via vectors to points. For this purpose, an evaluation of the image information, the orientation information and the motion information is performed. This is shown schematically in FIG. 2.

Figure 2:
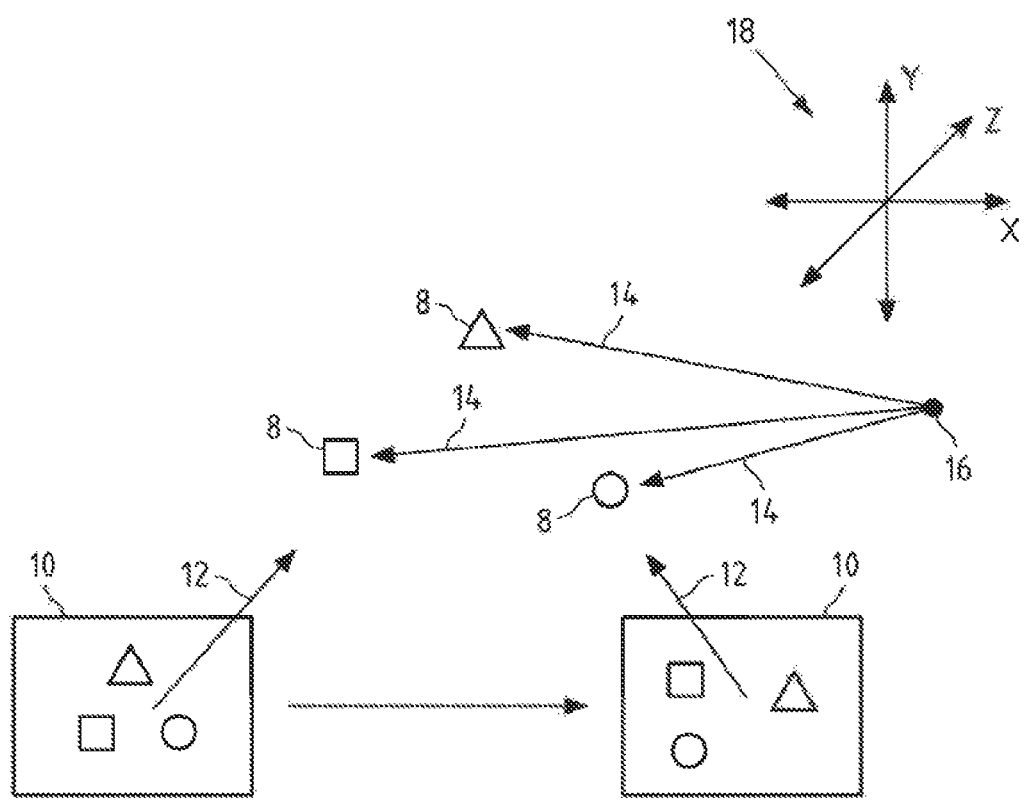
FIG. 2 a representation of features and their recognition in images as well as an assignment to points/point coordinates.
Figure 6:
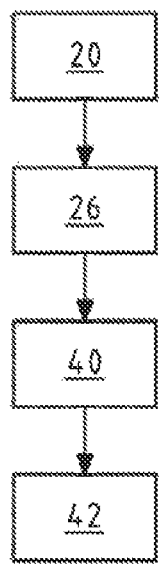
FIG. 6 a flow for optimizing a mobile station side point cloud.
Figure 7:
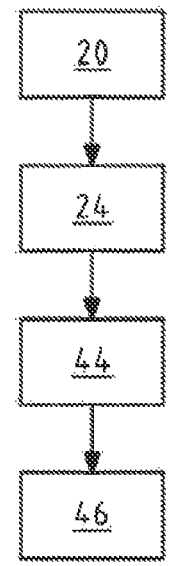
FIG. 7 a method for generating adjustment data for a mobile device.
Figure 8:
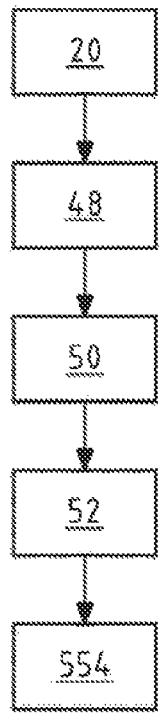
FIG. 8 a method for transmitting a point cloud to a mobile device.
Figure 9:
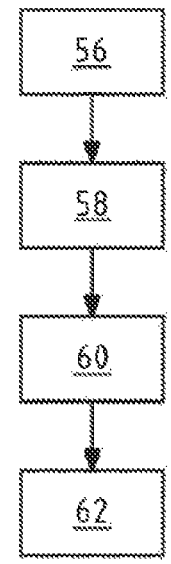
FIG. 9 a method for determining the position of a mobile device.

FIG. 2 shows a scene in which three salient points 8 are detectable. Such salient points 8 can be described by features that are detectable via suitable feature descriptors. In particular, the features of the points 8 are invariant to changes, such as motion, light change, panning, zooming or the like. It is also possible to define such feature descriptors that have higher-order invariance.

In a first image 10, the points 8 are shown in a certain arrangement with respect to each other. Based on the orientation data 12, it is possible to assign to the points not only coordinates within the image 10, but also, if necessary, coordinates which can be described by vectors 14 having at least one common origin 16. This is possible, in particular, if motion data 16 are also acquired in addition to the orientation data 12 and, for example, the same points 8 are detected in a different assignment to one another in a second image 10 with different orientation data 12. The change in the points 8, in particular their relative assignment to one another in the images 10, together with the orientation information 12 and the motion information 16 makes it possible to calculate the vectors 14 of the point coordinates of the points 8 on the mobile station side and/or on the server side.

In particular, a Cartesian coordinate system 18 is used for this purpose, with the y-axis parallel to gravity, the x-axis parallel to the horizontal, and the z-axis perpendicular to the plane spanned by the x- and y-axes. In particular, the vectors 14 are three-dimensional vectors. A transformation tensor, with which the globally valid vectors 14 can be calculated from the local positions of the points detected in the image, can be determined via the orientation information 12 and the movement information 16.

According to the subject matter, a mobile station 2 first transmits to the server 6 in each case an image 10, the associated orientation information 12, and the motion information 16 captured between two images 10, as shown in FIG. 3. In the server 6, the image data stream thus obtained is evaluated and a server-side point cloud is calculated by means of a SLAM system.

Since, on the one hand, higher computing power is available on the server side and also the storage capacity is basically unlimited, the number of points in a point cloud can likewise be virtually unlimited. This makes it possible to determine a point cloud for a large environment based on information from one or more mobile devices 2. In this regard, it is proposed, for example, that in a step 20, orientation data 12, motion data 16, and images 10 are received from at least one mobile device 2. After reception, for example, feature recognition is performed and points are detected based on feature descriptions. The points thus detected are extracted 22.

Then, an evaluation of the feature descriptions can be performed in step 24. Finally, a point cloud 30 is determined from the extracted points in step 26. This point cloud 30 is stored in a memory on the server side. The point cloud 30 is formed from a plurality of points having a unique identifier and at least point coordinates.

The point cloud 30 calculated on the server side is based in particular on a plurality of information from, for example, a plurality of different mobile devices. For position recognition, it is now possible to compare points recognized on the mobile station side with the points in the point cloud. If there is a match, the position of the mobile device can then be determined by using the orientation data 12 to determine the position of the mobile device 2 in the point cloud and thus in the real environment on the basis of the detected points.

Since the server-side point cloud 30 is more robust and accurate, the position determination is also more accurate. Step 20 can be followed by a step 32 in the evaluation, as shown in FIG. 5a. In this step 32, a comparison of previously acquired images 10 and points 8 with those of the server-side point cloud is performed, for example, to perform a loop closure. With the aid of this loop closure, it is possible to determine whether a mobile device 2 is located at the same position after a certain time and/or whether the same features can be detected in an image. This is of particular interest to correct a drift that occurs after a while. The points detected after loop closure (32) is detected are added to the point cloud 30 in step 34.

If a loop closure is detected, it is possible to use this server-side detected information to eliminate a mobile-station-side drift in the points of the mobile-station-side point cloud. For this purpose, in a step 36, it is first determined by what amount the mobile station-side calculated position of the mobile device 2, which was determined based on the motion data 16 and orientation data 12, deviates from the actual position of the mobile device 2. Since it was detected on the server side that the mobile device 2 has returned to its original position, the position relative to the beginning of an AR session is uniquely defined. If the position calculated on the mobile station side deviates from this, there is a drift whose amount can be determined (36). With the help of this amount of drift determined on the server side, it is possible to adjust the points of the point cloud calculated on the mobile station side (38).

This involves a correction of the point coordinates or vectors 14 of individual points 8. It is also possible to supplement a point cloud calculated on the mobile station side with points of a point cloud calculated on the server side. For this purpose, the point cloud 30 created between steps 20 and 26 is acquired. Furthermore, in a step 40, a mobile station-side point cloud is received. The points of the point cloud received at the mobile station side may be supplemented, corrected, or otherwise modified by the point cloud 30 determined at the server side. The thus optimized point cloud 30 can then be transmitted from the server 6 to the mobile device 2 in a step 42.

Since an evaluation of the image 10 is performed on the server side, a feature recognition is performed in step 24 after the image 10 (20) is received. In this feature detection, the invariance of the features is checked and, in particular, features can be defined using deep learning strategies.

Subsequently, it can be checked whether the feature recognition in an image 10 was good or bad (44) and from this it can be derived whether the acquired image 10 was sufficiently good in its quality for the feature recognition. Depending on this evaluation, at least one setting parameter for the camera (exposure, contrast, color and the like) can be determined in a step 46 and transmitted to the mobile device 2. There, the camera can be adjusted accordingly.

It is also possible to optimize the orientation detected at the mobile station. For this purpose, after receiving 20, a calculation of the orientation data 12 is performed on the server side in a step 48. The calculation of the orientation data 12 can, on the one hand, use the movement data 16 and orientation data 12 received from the mobile device 2 and, on the other hand, a comparison can be made between the points acquired on the mobile station side and the points of the point cloud 30 present on the server side. For example, it is possible that the point cloud on the mobile station side or the points of an image 10 are present in the point cloud 30 on the server side, but the point coordinates differ from each other. It may be determined that this discrepancy in point coordinates exists due to an erroneous conversion tensor, which may have been determined based on erroneous orientation information from the mobile device 2. If this is the case, an estimate of the actual orientation of the camera of the mobile device 2 may be calculated in a step 50. This information can be sent back to the mobile device 2, which can update its orientation information.

Furthermore, it is possible to determine anchors in the point cloud 30 in step 52, which can also be transmitted to the mobile device 2 in step 54.

Device-independent position determination is also possible. Here, points acquired on the mobile station side can be transmitted to the server 6 in a step 56. In a step 58, these points are compared with the points of the point cloud 30 on the mobile station side. On the basis of this comparison, a position determination is possible in which a correspondence in the points is determined. Based on this, a position determination (60) can be made.

The determined position and, if necessary, a point cloud enriched by points of the server-side point cloud 30 can be sent back to the mobile device (62).

The server-side point cloud is continuously checked and supplemented. As information is continuously received from one or more mobile devices on the server side, points are continuously added to the point cloud and/or points are corrected. As a result, the server-side point cloud becomes more accurate and detailed as the time of operation increases. On the server side, bundle adjustment, feature matching and outlier removal can be used to optimize the quality of the individual points in the point cloud. Features or feature descriptions (descriptors) can be continuously modified and added. Depending on the semantic environment, different feature descriptors can be used to optimize the image information and to convert it into points of the point cloud.

In particular, it is possible to check how good and how frequent a position determination of mobile devices is based on the points captured there by comparing them with the point cloud and the respective descriptors can be changed.

The present method thus creates a point cloud on the server side, which has a substantially global validity and can be acquired over a plurality of devices and made available to a plurality of devices.

What is claimed is:

1. A tangible, non-transitory, machine-readable medium storing instructions that when executed by one or more processors effectuate operations comprising:
   obtaining, by a computer system, a server-side point cloud generated by a server;
   obtaining, by the computer system, a mobile station-side point cloud generated by a mobile device;
   combining, by the computer system, at least one of the mobile station-side point cloud with data from the server-side point cloud to form an updated mobile station-side point cloud or the server-side point cloud with data from the mobile station-side point cloud to form an updated server-side point cloud; and
   generating, by the computer system, at least a portion of an environment map from the updated server-side point cloud or the mobile station-side point cloud.

2. The medium of claim 1, wherein the operations further comprise:
   creating, by the computer system at the server, the server-side point cloud using an image of a camera of the mobile device, motion data of the mobile device, and orientation data of the camera that is associated with the image.

3. The medium of claim 2, wherein the motion data includes inertial measurement data from an inertial measurement unit of the mobile device and the orientation data includes pose-transform data.

4. The medium of claim 2, wherein point coordinates of points of the mobile station-side point cloud are changed with aid of the motion data or the orientation data evaluated by the server, in particular in that a drift of the point coordinates of the points on the mobile station-side point cloud is corrected.

5. The medium of claim 2, wherein the orientation data is corrected on by the server with aid of the motion data.

6. The medium of claim 2, wherein at least one of a feature recognition or a feature description is performed by the server in the image using multi-scale oriented patches (MOPS) or scale-invariant feature transform (SIFT).

7. The medium of claim 2, wherein features are learned on by the server during at least one of feature recognition or a feature description that use deep learning.

8. The medium of claim 2, wherein a bundle adjustment is performed on by the server in the image.

9. The medium of claim 2, wherein the operations further comprise:
   determining, based on a server evaluation of the image, setting data for the camera; and
   transmitting the setting data to the mobile device.

10. The medium of claim 1, wherein the server-side point cloud or the mobile station-side point cloud is generated using a simultaneous localization and mapping algorithm.

11. The medium of claim 1, wherein the server-side point cloud and the mobile station-side point cloud include respective point coordinates, points of the server-side point cloud and the mobile station-side point cloud correspond respectively to a point coordinate.

12. The medium of claim 11, wherein the point coordinates are represented by vectors.

13. The medium of claim 1, wherein during the combination of the server-side point cloud with the mobile station-side point cloud, at least one of the following is performed: points of the server-side point cloud are at least partially supplemented by points of the mobile station-side point cloud, point coordinates of the points of the server-side point cloud are at least partially converted with aid of point coordinates of the points of the mobile station-side point cloud, at least one of the points of the mobile station-side point cloud are at least partially supplemented by the points of the server-side point cloud, the point coordinates of the points of the mobile station-side point cloud are at least partially converted with aid of the point coordinates of the points of the server-side point cloud.

14. The medium of claim 1, wherein the operations further comprise:
   removing, using statistical evaluation, an outlier from the mobile station-side point cloud.

15. The medium of claim 1, wherein the operations further comprise steps for generating the mobile station-side point cloud.

16. The medium of claim 1, wherein the operations further comprise:
   determining, using the server-side point cloud, a loop closure; and correcting, using the loop closure, a drift of points of the mobile station-side point cloud.

17. The medium of claim 16, wherein the correcting the drift includes a linear adjustment.

18. The medium of claim 1, wherein the operations further comprise:
operating, by the computer system, an augmented reality application using the server-side point cloud or the mobile station-side point cloud.

19. The medium of claim 1, wherein the operations further comprise:
determining at least two instances for the server-side point cloud, wherein in each instance at least one feature is learned by at least one of a feature recognition or a feature description by the server and the respective instances together with features are transmitted to the mobile device.

20. A method, comprising:
obtaining, by a computer system, a server-side point cloud generated by a server;
obtaining, by the computer system, a mobile station-side point cloud generated by a mobile device;
combining, by the computer system, at least one of the mobile station-side point cloud with data from the server-side point cloud to form an updated mobile station-side point cloud or the server-side point cloud with data from the mobile station-side point cloud to form an updated server-side point cloud; and
generating, by the computer system, at least a portion of an environment map from the updated server-side point cloud or the mobile station-side point cloud.

* * * * *